United States Patent [19]

Parr

[11] 4,151,891

[45] May 1, 1979

[54] VEHICLE WITH HOOD LATCH AND RELEASE ASSEMBLY

[75] Inventor: John A. Parr, Racine, Wis.

[73] Assignee: J. I. Case Company, Racine, Wis.

[21] Appl. No.: 887,334

[22] Filed: Mar. 16, 1978

[51] Int. Cl.$^{2}$ .............................................. B62D 25/12

[52] U.S. Cl. .................................... 180/69 C; 292/52; 292/226; 292/254; 292/DIG. 14

[58] Field of Search ................ 180/69 C, 69 R, 89.14, 180/89.13, 89.15, 89.16; 292/DIG. 14, 254, 226, 52; 296/76

[56] References Cited

U.S. PATENT DOCUMENTS

| | | | |
|---|---|---|---|
| 2,559,736 | 7/1951 | Scarborough | 292/254 X |
| 2,763,505 | 9/1956 | Krause | 292/226 X |
| 2,789,848 | 4/1957 | Krause | 292/52 X |
| 2,992,031 | 7/1961 | Krause et al. | 292/226 X |
| 3,064,748 | 11/1962 | Hill | 180/69 C |
| 3,448,820 | 6/1969 | Aiello et al. | 180/77 S |
| 3,749,434 | 7/1973 | Gley | 292/DIG. 14 |

FOREIGN PATENT DOCUMENTS

| | | | |
|---|---|---|---|
| 24538 | 1935 | Australia | 292/254 |

*Primary Examiner*—Joseph F. Peters, Jr.
*Assistant Examiner*—Milton L. Smith
*Attorney, Agent, or Firm*—Arthur J. Hansmann

[57] ABSTRACT

A vehicle with hood latch and release assembly having an abutment post on each side of the vehicle chassis and having a release member movable adjacent to the posts. A hood is pivotal up and down on the vehicle chassis and carries two latch members in the form of two cams which are pivotally mounted on the hood and are spring-urged thereon for engagement with each of the posts to hold the hood in the down position. A rubber cushion is disposed above each abutment post in the down positions, for cushioning the hood downwardly on the post and thus on the chassis. The release member extends across the vehicle and has a handle or grip portion on each end thereof so that the release member can be acutated from either side of the vehicle for releasing the latch and permitting the hood to be pivoted upwardly. The latch members are spring-urged to their securing position to hold the hood down, and there are angled guide-surfaces which permit lateral deviation of the hood but final lateral guidance thereof.

6 Claims, 3 Drawing Figures

VEHICLE WITH HOOD LATCH AND RELEASE ASSEMBLY

This invention relates to a vehicle with hood latch and release assembly, and, more particularly, it relates to an up and down pivotal hood which is automatically secured in a down and latched position and which can be released from either side of the vehicle for upward pivoting of the hood.

BACKGROUND OF THE INVENTION

The prior art is of course already aware of many examples of various types of vehicle hood and latch arrangements whereby the hood can be pivoted up and down from either a rearward or a forward pivoted position on the chassis. Those skilled in the art are aware of those prior art arrangements, and no specific disclosure thereof is deemed necessary in this document. One general showing of a tractor having an engine and a hood which could be pivoted up and down at its forward location is seen in U.S. Pat. No. 3,448,820. Thus, persons skilled in the art, are aware of the arrangements of pivotally mounted tractor hoods which can be pivoted at the front of the vehicle and which are latched at the rear of the hood, and U.S. Pat. No. 3,064,748 shows that specific arrangement.

The present invention relates to a forwardly pivoted vehicle hood with a spring-urged latch means having a camming effect and having a cushion member which supports the hood in the downward position and also having a release which can be actuated from either side of the vehicle. As such, the assembly of the vehicle and the hood and the latching means is an improvement over the arrangements and assemblies heretofore known, and,the assembly of the present invention provides for a secure and readily releasable control of the pivotal hood, and it also allows for misalignment of the hood relative to the vehicle chassis but yet assures the secured latched position of the hood.

Still further, the present invention provides a self-locking type of latch having a camming effect which provides for forcing downwardly on the hood to secure it in the down position, under the influence of a spring acting on the cam-type latch member, and there is a resilient abutment which supports the hood upwardly and thus the hood is secured between the spring-loaded cam latch and the resilient abutment, all for providing for securing the hood in the down position and yet cushioning it in that position and having the secured position automatically achieved under the weight of the hood itself. Further, the latch assembly is actually in pairs, with an abutment post and a latch on each side of the vehicle, and there is one single release member which has a handle on each side of the vehicle so that the release can be maneuvered from each side of the vehicle and thus release both of the latches from either side of the vehicle. Still further, there can be misalignment between the hood and the vehicle chassis in both the transverse and longitudinal directions of the vehicle, but yet the hood is readily and securely held in the down position and is readily and easily released.

Other objects and advantages have become apparent upon reading the following description in light of the accompanying drawings.

DETAILED DESCRIPTION OF THE PREFERRED EMBODIMENT

Figure 1:
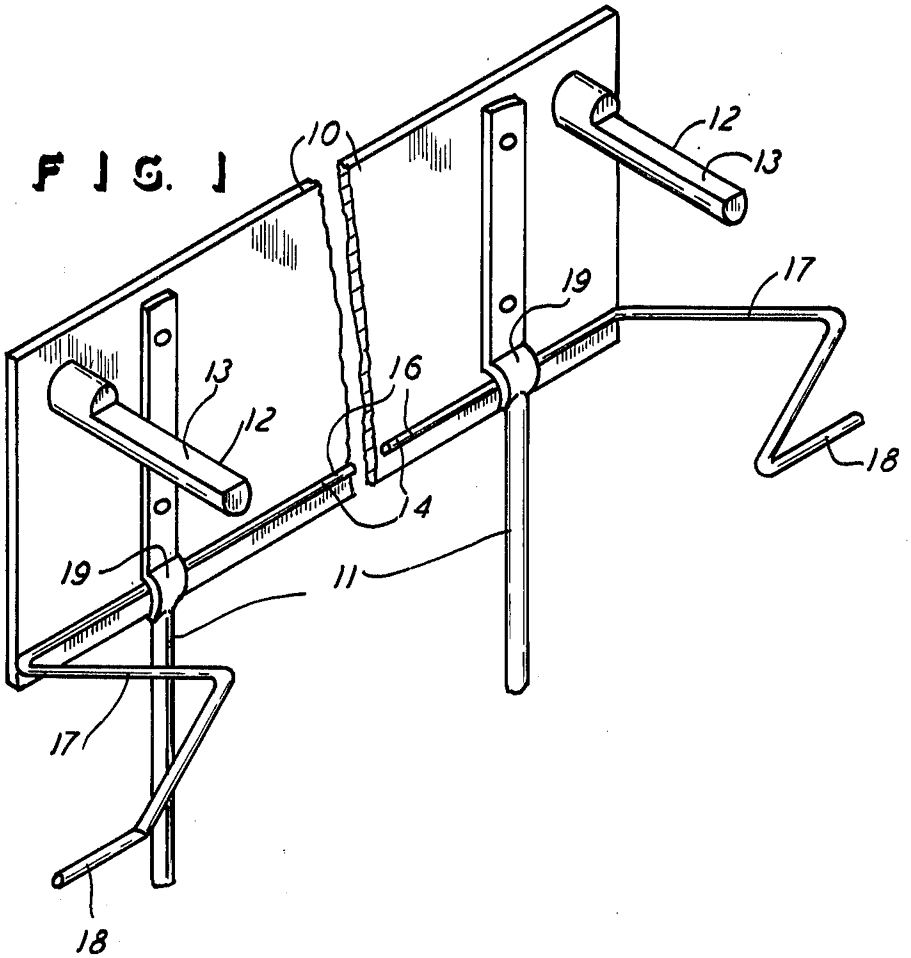
FIG. 1 is a front perspective view of a fragment of the vehicle chassis and the release member mounted thereon.

One of ordinary skill in the art will understand, by reason of this disclosure and viewing of the drawings, that this invention pertains to a vehicle, such as a tractor, having a hood which is pivotally mounted at its forward end and which has latching mechanism at its rearward end. Thus, FIG. 1 shows a vehicle chassis piece 10 which extends transversely of the fore-and-aft direction of the tractor, that is, across the forward and rearward direction of the tractor or from side to side on the tractor, and support pieces 11 are included in the chassis and are to support the upright plate or chassis piece 10 in the orientation shown in FIGS. 1 and 3. The chassis also has abutment members, in the form of posts 12, affixed to the chassis piece 10 and extending forwardly thereof in the fore-and-aft direction of the tractor, and each member 12 presents an upwardly-faced support or abutment surface 13 which extends for a significant distance in the fore-and-aft direction of the tractor, as shown in FIG. 1 and to thus accomodate fore-and-aft positioning or misalignment of the hood which bears down upon and is supported by the abutment members 12 which are therefore disposed on each side of the vehicle or tractor. The members 12 are in a fixed position on the chassis and they do not move relative to the vehicle or tractor.

Figure 3:
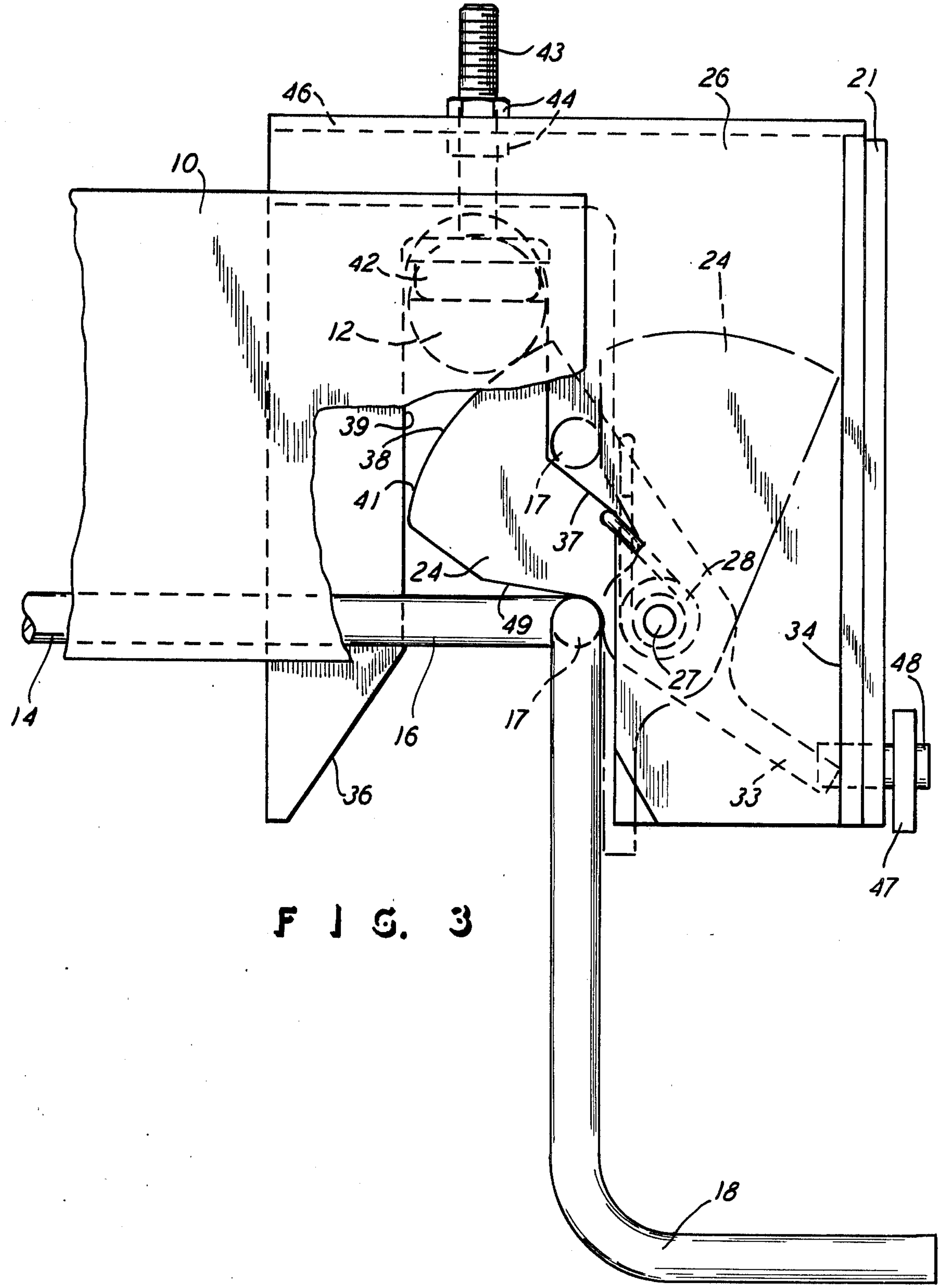
FIG. 3 is a rear elevational view of the right side of the chassis and release member of FIG. 1 and the right hand latch member shown therewith.

FIGS. 1 and 3 also show a release member 14, in a rod form and having an intermediate portion 16 and offset lift portions 17 and end hand grip portions 18, all extending in the form of a crank, as seen in FIG. 1. Thus the release member 14 extends across the vehicle, from side to side thereof, and the grip portions 18 extend laterally of the vehicle and are accessible at each side of the vehicle so that the operator can maneuver the release member 14 from either side of the vehicle to release the latch mechanism, as herein-after explained. The release member 14 is disposed in inteference fit with the portions designated 19 of the support members 11, so that the release member 14 can be placed in any particular pivoted position determined by the positioning of the handles 18. Thus, the release member 14 is pivotal about the longitudinal axis defined by the center rod portion 16, so that the offset portions 17 can move up and down in a vertical plane for releasing the latch mechanism as explained herein-after. It will be noted that the offset portions 17 swing adjacent the posts 12 and to the outsides thereof, as indicated in FIG. 3.

Figure 2:
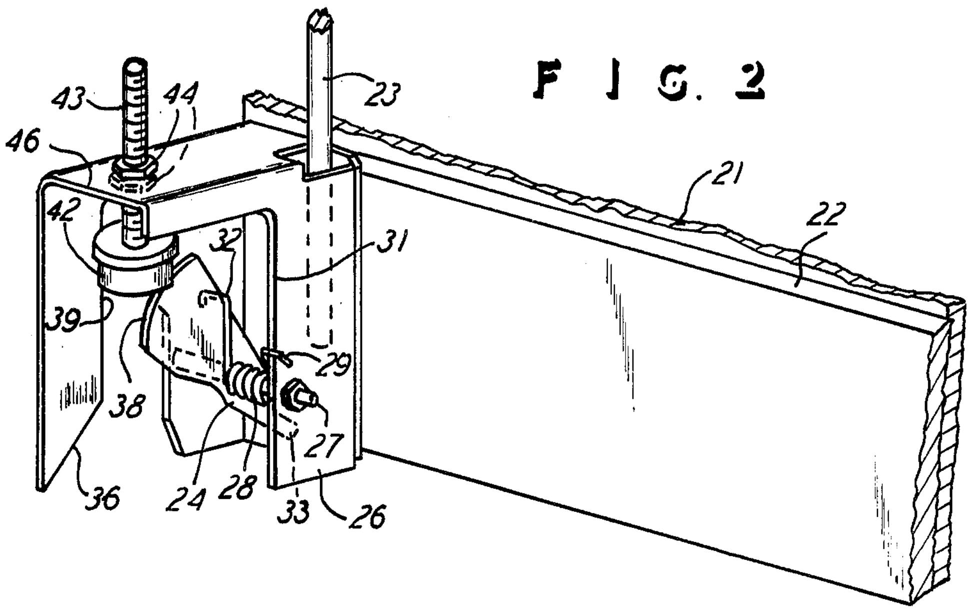
FIG. 2 is a front perspective view of a fragment of the hood with one latch mounted thereon.

FIG. 2 shows a fragment of the vehicle hood 21 which has a frame piece 22 extending along the side of the hood 21, and there is a hood brace piece 23 shown, all for foming a conventional type of hood which would extend over the tractor engine in the usual manner, such as shown in the aforesaid patents. Thus, anyone skilled in the art will understand that there is a conventional type of hood 21 having the improved latch assembly and release mechanism shown and explained herein.

The hood 21 pivots at the forward end thereof and that of course is forward on the tractor or vehicle having the chassis 10. A latch member 24 is pivotally mounted on the hood 21 which includes the mounting bracket 26 and the support pin 27 affixed to the bracket 26 which in turn is affixed to the hood 21, all in any conventional manner of affixing. The latch 24 is thus pivotal about the axis of the pin 27, and the latch therefore pivots in the plane transverse to the fore-and-aft direction of the vehicle, and that would also be in the plane which is parallel to the pivot axis of the hood 21. The spring 28 is wrapped around the pin 27 and engages the latch member 24 to bear downwardly thereon and urge the member 24 down to the automatic latched position described hereinafter. The spring end 29 engages the bracket edge 31 and is thus anchored to the bracket 26, and the other spring end 32 extends over the top surface of the latch member 24 and is thus engaged therewith and bears downwardly on the latch member 24 to secure the same in the latched position which is shown in full lines in FIG. 3. The latch member end 33 extends to abut the surface 34 of the bracket 26 to thus preclude pivoting of the latch member 24 in the counter-clockwise direction beyond the position shown in FIG. 3, and thus the latch member 24 is always ready for engagement when it is beyond the influence of the release member 14, such as shown in full lines in FIG. 3.

It will also be seen that the bracket 26, and thus the hood 21, has a wedge-shaped opening defined by the angled surfaces 36 and 37 which are disposed below the extending surface 38 of the latch member 24, and thus the angled surfaces 36 and 37 present a wedge-shaped opening which guides the bracket 26 onto the post 12 at each side of the vehicle. That is, there are two brackets 26, and thus duplicates of the assemblies shown in FIGS. 2 and 3, on each side of the vehicle, with one assembly for each of the two posts 12. Also, the bracket 26 has a post-receiving opening 39 which is of a size approximately the thickness of each post 12 for snugly receiving the post 12, as shown in FIG. 3 and to thus eliminate any sidewise movement of the hood when it is in the latched position of FIG. 3.

The latch member surface 38 is an arcuate surface which is not concentric with the axis of the pin 27, all as seen in FIG. 3, and thus the surface 38 is a camming surface which slides along the underneath circumference of the semi-circular configuration of the post 12, as shown in FIG. 3. As such, the latching member 24 is self-securing and forcing relative to forcing downwardly on the hood 21 and firmly secured relative to the post 12. In that arrangement, the end 41 of the surface 38 is actually closer to the axis of the pin 27, compared to the opposite end of the camming surface 38, and thus the surface 38 is a camming surface oriented in the direction shown and described.

The bracket 26, and thus hood 21, also carries an abutment member 42 which is a resilient member in the form of a rubber block or the like affixed to a threaded stem 43 which is vertically adjustable relative to the bracket 26 by means of securing nuts 44 which are threaded onto the stem 43 and which flank the bracket top wall 46. As shown in FIG. 3, the resilient abutment member 42 rests downwardly on the post flat portion 13 to thus support the hood 21 on the chassis 10 in a cushioned relation therebetween. Further, by virtue of the arrangement of latching member 24 as described, including the camming surface 38 and the spring 28, the latching member 24 forces the hood 21 downwardly to where the cushion member 42 is in firm contact with the post 12 to firmly secure the hood 21 relative to the chassis 10 in the latched position, all as desired.

FIG. 3 therefore shows that the hood 21 is pivotally mounted on the chassis 10 which includes the member 47 supporting a pivot pin 48 extending through the member 47 and through the hood 21 at the front end of the vehicle. The hood 21 is shown in the downwardly or latched position in FIG. 3, and the solid line showing of the latch member 24 shows that its camming surface 38 is forced underneath the post 12 by the spring 28 to thus have the latching member 24 and the cushioned or resilient abutment piece 42 securely hold the hood in that downward position.

FIG. 3 further shows that the release member 14 can be swung upwardly, by maneuvering of the grip portion 18, so that the offset portion 17 will move to the upward position shown, and it thus bears against the latch edge 49 to pivot the latch member 24 to the dot-dash position shown in FIG. 3 and thus clear from its latched position relative to the post 12. In that unlatched position, the hood 21 can be pivoted upwardly about the axis of its mounting pin or member 48, for access to the vehicle engine compartment, all in an understandable and desirable manner. Of course when the release member 14 is returned to its lowered or solid line position as shown in FIGS. 1 and 3, then the spring 28 will return the latch member 24 to its solid line position of FIG. 3 and the hood can again be lowered and the latch member 24 will abut the post 12 and eventually swing thereunder to the solid line position shown in FIG. 3 for securing the hood in the latched and downward position shown and described herein. Also, it will be seen and understood that the abutment member 42 is vertically adjustable, by means of nuts 44 and the threaded stem 43, so that the position of the abutment member 42 relative to the latch 24 and the post 12 can be adjusted so that proper snug positioning of the post 12 relative to the latch member 24 and the abutment member 42 can be achieved.

As mentioned, the inclined surfaces 36 and 37 present a wedge-shaped opening leading into the restraining opening 39 for the post 12, and thus there can be lateral misalignment of the hood 21 relative to the chassis 10 and the hood will automatically align when it is lowered onto the two posts 12. Further, since the two posts 12 extend in the fore-and-aft direction of the tractor, and since the latch member 24 and the abutment member 42 can engage the post 12 at any position along the length of the post 24, as defined by the flat surface 13, there can be fore-and-aft misalignment of the hood 21 relative to the chassis and that too can be overcome and accommodated with this assembly.

Thus, there is a forward tilting engine hood with a self-locking latch and with a release accessible on each side of the vehicle or hood. The assembly has only two moving parts, namely, the latch member 24 and the release lever 14, and the latch member 24 is spring-loaded in the locked position. When the hood is closed or down, the latches are captivated under the latching posts 12 by means of the rubber mounts or abutments 42 which also provide a cushion for hood vibration. The release lever 14 is held in interference fit with the support members 11 to avoid unintentional movement of the lever 14. The release lever 14 is operated from either side of the hood and engages both of the latch members 24 at a right angle thereto to release them from the posts 12, and the entire arrangement is such that it provides for misalignment of the hood but positions the hood in aligned position in the downward position.

What is claimed is:

1. A vehicle with hood latch and release assembly, comprising a vehicle chassis, a hood pivotally mounted on said vehicle chassis for up and down movement, a latch member movably mounted on said hood and movable therewith and having a cam surface, a spring connected with said latch member for urging said latch member to one position, a retainer member affixed to said chassis and disposed in the up and down path of movement of said latch member and in contact with said latch member cam surface in the down position of said hood when said spring is urging said latch member toward said one position, a resilient block abutment member on said hood and spaced from said latch member and disposed relative to said retainer member and in contact with the side thereof opposite the position of said latch member relative to said retainer member in the down position of said hood for cushioning said hood relative to said chassis, whereby said latch member and said abutment member respectively preclude pivoting of said hood in the up and down directions, and a release movably mounted on said chassis to be engageable with said latch member to move the latter away from said one position and free of said retainer member for upward pivoting of said hood.

2. The vehicle with hood latch and release assembly, as claimed in claim 1, wherein said resilient block abutment member and said latch member are relatively disposed for respective upper and lower engagement of said retainer member in the down position of said hood to have said resilient block abutment member rest down on said retainer member.

3. The vehicle with hood latch and release assembly, as claimed in claim 1, wherein there are two of each of said latch member and said spring and said retainer member and said resilient block abutment member, with each thereof spaced apart transversely of the fore-and-aft direction of the vehicle, and said release extending transversely of said fore-and-aft direction and having a handle on each end thereof for inducing movement from both sides of the vehicle.

4. The vehicle with hood latch and release assembly, as claimed in claim 1, wherein said release extends transversely of the fore-and-aft direction of said vehicle, and a hand grip on each extending end of said release for maneuvering of said release from both sides of said vehicle.

5. The vehicle with hood latch and release assembly, as claimed in claim 1, wherein said retainer member is a post extending horizontally on said chassis, and said latch member cam surface is slidable on and underneath said post for resisting upward movement of said hood, and said resilient block abutment member is disposed above said post for seating said hood thereon.

6. A vehicle with hood latch and release assembly, comprising a vehicle chassis, a hood pivotally mounted on said vehicle chassis for up and down movement, a latch member movably mounted on said hood and movable therewith, a spring connected with said latch member for urging said latch member to one position, a retainer member affixed to said chassis and disposed in the up and down path of movement of said latch member to contact said latch member in the down position of said hood when said spring is urging said latch member toward said one position, an abutment on said hood and spaced from said latch member and disposed relative to said retainer member to be presented to the side thereof opposite the position of said latch member relative to said retainer member, whereby said latch member and said abutment respectively preclude pivoting of said hood in the up and down directions, a release movably mounted on said chassis to be engageable with said latch member to move the latter away from said one position and free of said retainer member for upward pivoting of said hood, said hood having a wedge-shaped opening in the direction transverse of the fore-and-aft direction of the vehicle and disposed below said latch member, and said retainer member being a post extending in the vehicle fore-and-aft direction to be received by said wedge-shaped opening when said hood is lowered, to thereby guide said latch member onto said post within the limits of said wedge-shaped opening and thereby allow for misalignment of said hood with said chassis.

* * * * *